(12) United States Patent
Miller et al.

(10) Patent No.: US 7,806,365 B2
(45) Date of Patent: Oct. 5, 2010

(54) LONG ENDURANCE HYDROGEN POWERED VEHICLE

(75) Inventors: Gerald D. Miller, Mercer Island, WA (US); Wesley Moore, Seattle, WA (US); Adrian Viisoreanu, Kent, WA (US); Russell W. Morris, Redmond, WA (US); Ronald W. Davidson, St. Paul, MO (US); Shailesh Atreya, Irvine, CA (US); Albert D. Olsen, Huntington Beach, CA (US); William Bigbee-Hansen, Renton, WA (US)

(73) Assignee: The Boeing Company, Chicago, IL (US)

( * ) Notice: Subject to any disclaimer, the term of this patent is extended or adjusted under 35 U.S.C. 154(b) by 254 days.

(21) Appl. No.: 11/428,706

(22) Filed: Jul. 5, 2006

(65) Prior Publication Data

US 2008/0006743 A1    Jan. 10, 2008

(51) Int. Cl.
*B64D 27/00* (2006.01)
(52) U.S. Cl. .................. 244/59; 244/53 R; 244/135 R
(58) Field of Classification Search ............ 244/135 R, 244/53 R, 59; 60/267; 123/557; 220/560.04, 220/11, 592.27, 651, 653, 560.05, 560.07, 220/560.09, 560.1, 560
See application file for complete search history.

(56) References Cited

U.S. PATENT DOCUMENTS 2,986,011 A  *  5/1961  Murphy ...................... 62/53.2
3,844,262 A  * 10/1974  Dieges ......................... 123/567
5,106,035 A  *  4/1992  Langford, III ................ 244/59
5,150,182 A  *  9/1992  Capps et al. ................. 257/436
6,550,717 B1 *  4/2003  MacCready et al. .......... 244/13
2004/0118969 A1   6/2004  MacCready et al.

FOREIGN PATENT DOCUMENTS

GB           942370        11/1963

OTHER PUBLICATIONS

Brewer, G. Daniel. "Hydrogen Aircraft technology." CRC Press, 1991. pp. 15, 27, 46-47, 63, 65, 67-68, 97-98, 107, 152, 158, 182, 190-191, 292-293.*
Wing Design. (http://web.archive.org/web/20050323150635/http://www.allstar.fiu.edu/aero/wing31.htm). Mar. 23, 2005.*
Brewer, Daniel. "Hydrogen Aircraft Technology." 1991. Reference previously cited, newly submitted pp. 28-30, 153, 218, 302-303.*
Michael Taylor, "Brassey's World Aircraft & Systems Directory 1999/2000" XP002477329, p. 220 (1999).
Atreya et al., "Power System Comparisons for a High Altitude Long Endurance (HALE) Remotely Operated Aircraft (ROA)" AIAA 5th Aviation, Technology, Integration, and Operations Conference (ATIO), 26, XP008090388 (Oct. 2005).

* cited by examiner

*Primary Examiner*—Timothy D Collins
*Assistant Examiner*—Michael Kreiner
(74) *Attorney, Agent, or Firm*—Tung & Associates

(57) ABSTRACT

Hydrogen powered air vehicles that in some embodiments can fly with very long endurance (10 or more days) at altitudes over 60,000 ft carrying payloads of up to 2,000 pounds. Embodiments may include features such as large wingspan relative to fuselage and an all composite or partial composite structure for light weight and strength. The aircraft of the invention use one or more internal combustion engines adapted for hydrogen combustion, each engine driving propellers. The hydrogen fuel is stored on board in containers, located within the fuselage, as a cryogenic liquid, and is vaporized in a heat exchanger before delivery to the internal combustion engine.

19 Claims, 5 Drawing Sheets

LONG ENDURANCE HYDROGEN POWERED VEHICLE

STATEMENT REGARDING FEDERALLY SPONSORED RESEARCH OR DEVELOPMENT

The United States government has a paid-up license in this invention and the right in limited circumstances to require the patent owner to license others on reasonable terms as provided by the terms of an applicable contract.

TECHNICAL FIELD

The present invention relates generally to aerospace technology and more particularly, the present invention relates to hydrogen powered high altitude aircraft.

BACKGROUND

Certain specialized aircraft are designed to fly long distances and stay aloft for long periods of time. These are sometimes known by the acronym "HALE"—high altitude long endurance. However, the aircraft need not necessarily fly at high altitudes. These aircraft are typically unmanned, remotely controlled and are useful or potentially useful in a variety of applications. For example, in surveillance to conduct aerial patrols along a border, or along a coast of a nation or state, or in remote areas to act as a substitute for a "cell tower" for cellular communications. For such uses, it is desirable that these aircraft have the capability to remain aloft for long periods (more than about three days) and traverse a significant area during that time. Accordingly, the aircraft carry a relatively large quantity of fuel to enable long endurance, whether deployed at high or low altitude.

Typically, these aircraft present a large external surface area: they tend to have very large wings relative to fuselage length, typically more than about 3.0. Because fuel is typically stored in the wings, the design of these large wings is generally a compromise between the requirements of "lift" to launch and maintaining the aircraft aloft, and the requirement for fuel storage. In these types of craft there is an additional trade off between reduction in weight (and hence fuel requirements) to extend mission capability versus the increased weight necessary to carry sufficient fuel for long endurance. One approach to meeting these conflicting requirements might be to use solar power but technology to demonstrate flight longer than about 24 hours has not yet been developed. The use of lighter than air stratospheric airships has been proposed but while these achieve high altitude and can stay aloft for days, they are expensive and susceptible to cross winds and so lack the path stability required to carry out missions that require a fixed path of flight.

Accordingly, it is desirable to develop an aircraft that could be deployed at high or low altitude that has long endurance and directional stability under most of the expected conditions encountered when aloft. In addition, it would be a benefit if the wings could be designed optimally for flight conditions rather than as a compromise with necessary fuel carrying capability in the wings. Furthermore, other desirable features and characteristics of the present invention will become apparent from the subsequent detailed description and the appended claims, taken in conjunction with the accompanying drawings and the foregoing technical field and background.

BRIEF SUMMARY

This invention provides unmanned hydrogen powered air vehicles that in some embodiments can fly very long endurance (10 or more days) at altitudes over 60,000 ft carrying significant payloads of up to 2,000 pounds. Embodiments may include features such as large wing spans relative to fuselage (3.0 and greater) and an all composite or partial composite structure for light weight and strength. An embodiment of the aircraft uses one or more internal combustion engines adapted for hydrogen combustion, each engine driving propellers. The hydrogen fuel is stored on board in containers, located within the fuselage, as a cryogenic liquid, and is vaporized in a heat exchanger before charge to the internal combustion engine. In some embodiments, these features enable the craft to provide more than 10 days endurance.

Embodiments of the aircraft may include one or more combination or all of several unique features: a hydrogen powered engine; on-board fuel storage of liquid hydrogen in cryogenic containers such as vacuum Dewar fuel tanks; high aspect ratio wings incorporating a high performance laminar flow airfoil; a primarily composite, very light-weight airframe structure; and continuous operation as an unmanned, autonomous flying vehicle for up to about 10 days.

Embodiments of the invention can provide unprecedented flight endurance, ranging from over 30 days of endurance capability at altitudes near sea level to 10 days at 65,000 ft altitude, all while carrying a mission communications and payload suit weighing approximately 1,000 lbs. Additionally, embodiments of the air vehicles may include sufficient reliability and/or redundancy of its systems to maintain very-high mission reliability of greater than 90%, if required, over its multi-day flight endurance. The long endurance at high altitude, coupled with its significant payload capacity will allow the air vehicle to provide significantly lower cost solutions in communications, surveillance, data relay and like applications The above and other aspects of the invention may be carried out in one form by an embodiment that is a winged aircraft with a fuselage that encloses a cryogenic container adapted to contain liquid hydrogen; a heat exchanger in fluid communication with an interior of the container, the heat exchanger adapted for receiving liquid hydrogen from the container; and an engine in fluid communication with the heat exchanger, the engine adapted for combustion of gaseous hydrogen as fuel.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The invention may be carried out in one form by an embodiment that is a winged aircraft with a fuselage that encloses a cryogenic container adapted to contain liquid hydrogen; a heat exchanger in fluid communication with an interior of the container and adapted for receiving liquid hydrogen from the container; and an engine adapted for combustion of gaseous hydrogen as fuel, in fluid communication with the heat exchanger.

Figure 1:
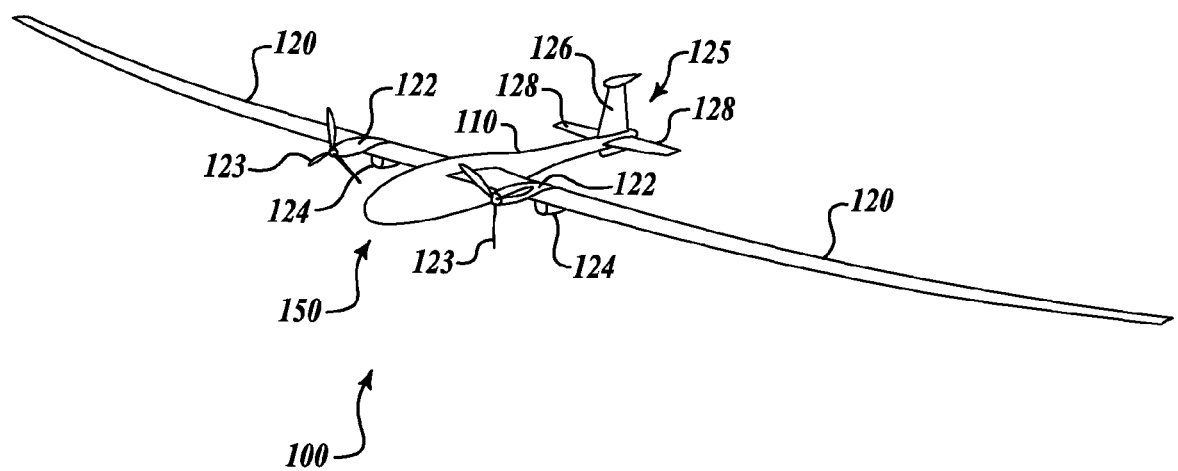
FIG. 1 is a schematic perspective view of a high altitude aircraft depicting the long wingspan.

FIG. 1 depicts schematically an aircraft 100 of the type useful in the invention: it has a fuselage 110 and opposed wings 120 extending from the fuselage 110. The aircraft further has a tail section 125 that includes a rudder 126 and a pair of rear stabilizers 128 (seen more clearly in FIG. 2). The aircraft wings 120 are long in comparison with the length of the fuselage 110, as is typical in long endurance high altitude aircraft. Typically, but not necessarily, these types of aircraft 100 have a wingspan to fuselage length ratio of 3.0 to about 4.0. While these are characterized as "high altitude" aircraft, meaning they are intended to fly at heights of about 35,000 ft. or more, often 65,000 ft., above sea level, they are also useful at lower altitudes, closer to sea level. The fuselage may comprise a central portion of the aircraft, and various embodiments that include a blended wing body or flying wing do not depart from the scope of the invention.

The embodiment shown in FIG. 1 also has a pair of engines 122, each driving a propeller 123 and each having a nacelle 124. Of course, other aircraft embodiments may have a single engine or may have a pair of engines on each wing. Thus, the number of engines is not a limiting factor except that use of a pair of engines provides both redundancy in case of engine failure as well as light weight to conserve fuel for a multi-day long mission.

As explained below, the engines 122 are adapted to hydrogen fuel. Fuel is stored on board the aircraft 100 in cryogenic tanks 300, shown in FIG. 2 in liquid form, at a pressure of about 30 psi, or other suitable pressure deemed safe and useful. While two tanks 300 are shown, and while these are spherical, one or more tanks of different shapes may be used. As shown, the tanks 300 are contained within a space or cavity formed in the fuselage 110. In the example, one tank 300 is ahead of the wing attachment location 130, and the other tank 300 of equal size is rear of wing attachment location 130. This controls the location of the center of mass of the craft 100 to permit stable flight of the craft. During flight, fuel may be taken from both tanks 300 equally or alternately from each to maintain the center of mass of the craft in a location that ensures craft stability. The nose 150 of the particular aircraft 100 illustrated is adapted to contain control equipment 155 and other equipment ancillary to a mission of the aircraft.

Figure 2:
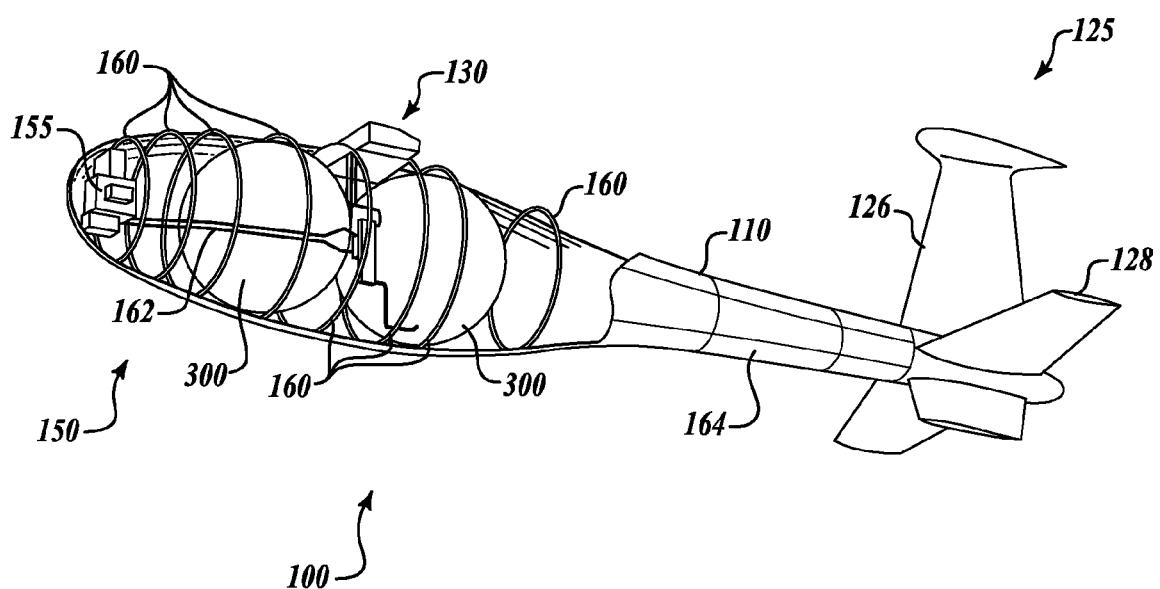
FIG. 2 is a partial cross sectional view of an aircraft fuselage according to an embodiment of the invention depicting hydrogen fuel storage containers.

In the embodiment of FIG. 2, the aircraft 100 is of light weight construction and is made up of a series of skin panels 164 stabilized by a series of underlying supporting frames 160 with longitudinal longerons 162 extending between the frames 160. Together with the skin 164, these frames 160 and longerons 162 form the aircraft fuselage 110. Frames 160 and longerons 162 also provide hard points for the attachment of fuel tanks, landing gear, systems and payload and distribute the loads into the skin 164. The fuselage shape is selected to conform to a desired (lateral) cross sectional shape of the aircraft that meets several purposes, for example: aerodynamics (drag reduction, etc.) and the mission (size of tanks to carry fuel, for example). Accordingly, the frames 160 are of a shape that are approximately oval in some embodiments, but can vary. To meet the lowest weight criteria while meeting strength requirements, the frames 160 may be fabricated of composite materials, such as carbon fiber impregnated with a suitable engineering polymer such as polyaryletherketone, or epoxy and the like. The frames 160 may alternatively be made of a strong light weight metal alloy, such as an aluminum or titanium alloy. As many longerons 162 as necessary may be used to make a sound structure for fuselage 110. The longerons 162 may likewise also be of composite materials or may be of a strong light weight metal alloy, such as an aluminum or titanium alloy. Similarly, the skin panels 164 may be of a graphite or fiberglass/epoxy composite sandwich or another composite or light weight metal. Of course, a combination of materials may also be used to take advantage of properties and to achieve a light weight aircraft that meets a reasonable or acceptable cost as balanced against the added fuel consumption and reduced range of a heavier craft.

Because embodiments of the aircraft of the invention have hydrogen tanks located within the fuselage, the wings can be designed for optimum performance without any compromises with regard to fuel carrying capacity as was the case with aircraft that have fuel tanks within the wings. Accordingly, embodiments of aircraft in accordance with the invention may have high aspect ratio wings incorporating a high performance laminar flow airfoil that might otherwise not be possible.

With regard to the hydrogen-adapted internal combustion engine, any reliable automotive or aircraft engine may be adapted for this purpose by making appropriate modifications. In addition, as with any modern engine, the engine should have an engine control module ("ECU") that may be modified to take into account the characteristics of hydrogen fuel. Further, to ensure sufficient power, the engine should desirably but not necessarily have compression turbines that increase engine intake air pressure, and these should have intercoolers to remove heat of compression and to permit cooler air feed to the engine, as shown below in the description of FIG. 4.

Figure 3:
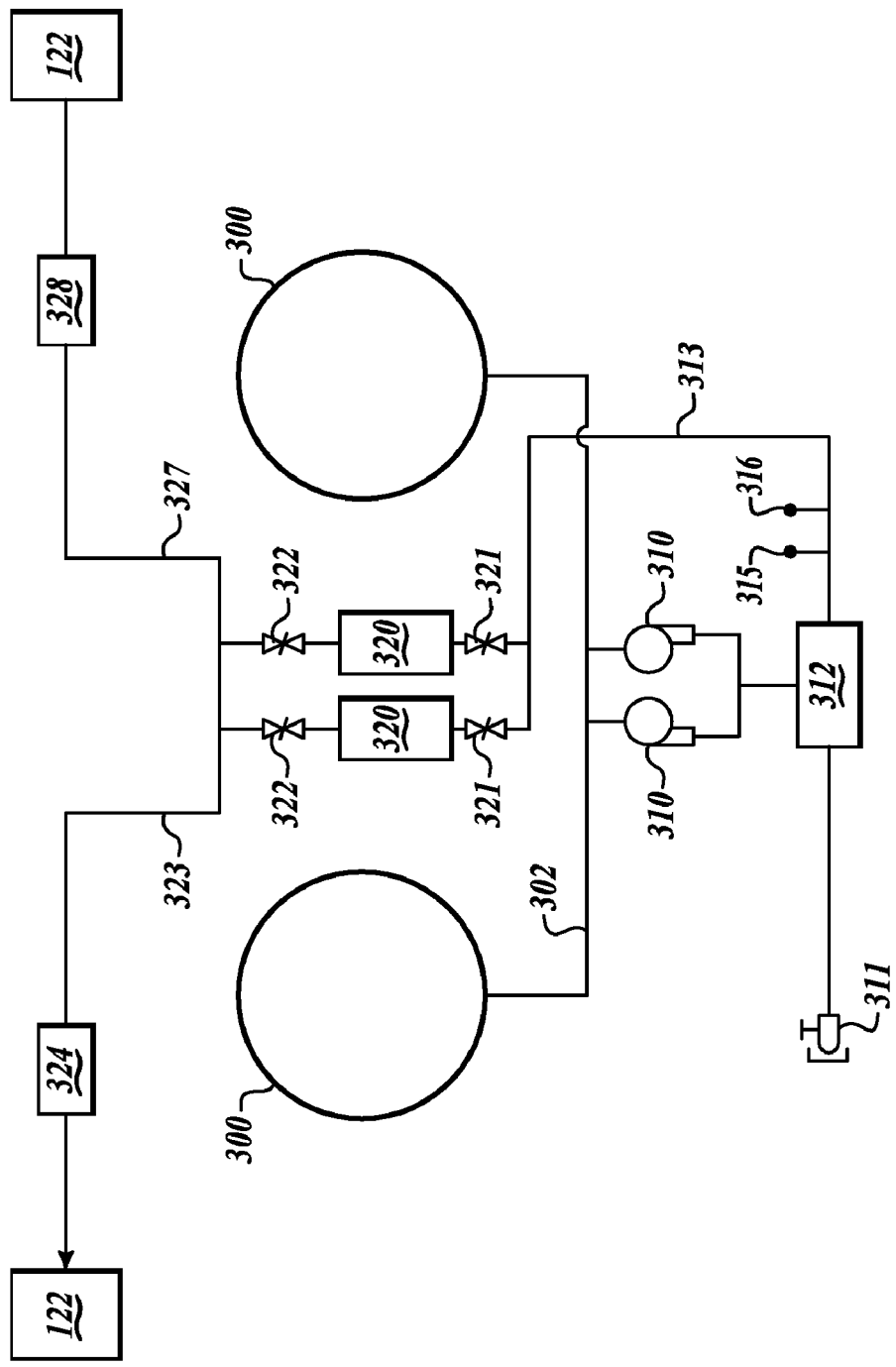
FIG. 3 is a block diagram depicting a flow scheme for supplying hydrogen fuel to the engine according to an embodiment of the invention.

As shown in FIG. 3, a simplified flow diagram of an embodiment of the fuel system, the fuel tanks 300 each feed into a common outlet conduit 302 that is in communication with suction sides of pumps 310. The pumps 310 charge liquid hydrogen to a hydrogen reservoir 312 that has appropriate safety features, such as a vent system. Reservoir 312 has a safety vent 311 and is pressured by the pumps 310 to a pressure of about 225 psi, in some embodiments. Liquid hydrogen exiting the reservoir in conduit 313 is monitored for temperature 315 and pressure 316. The flow in conduit 313 is controllably split into each of two heat exchangers 320 by a pair of inlet control valves 321. In the heat exchangers 320, as explained in more detail below, the hydrogen is heated against a warmer coolant to a warmed gas for charging as fuel to the engines 122. Gas exits the heat exchangers 320 through outlet control valves 322 in conduits 323 and 327 under control of pressure regulators 324 and 328, respectively, to the engines 122, 122.

Figure 4:
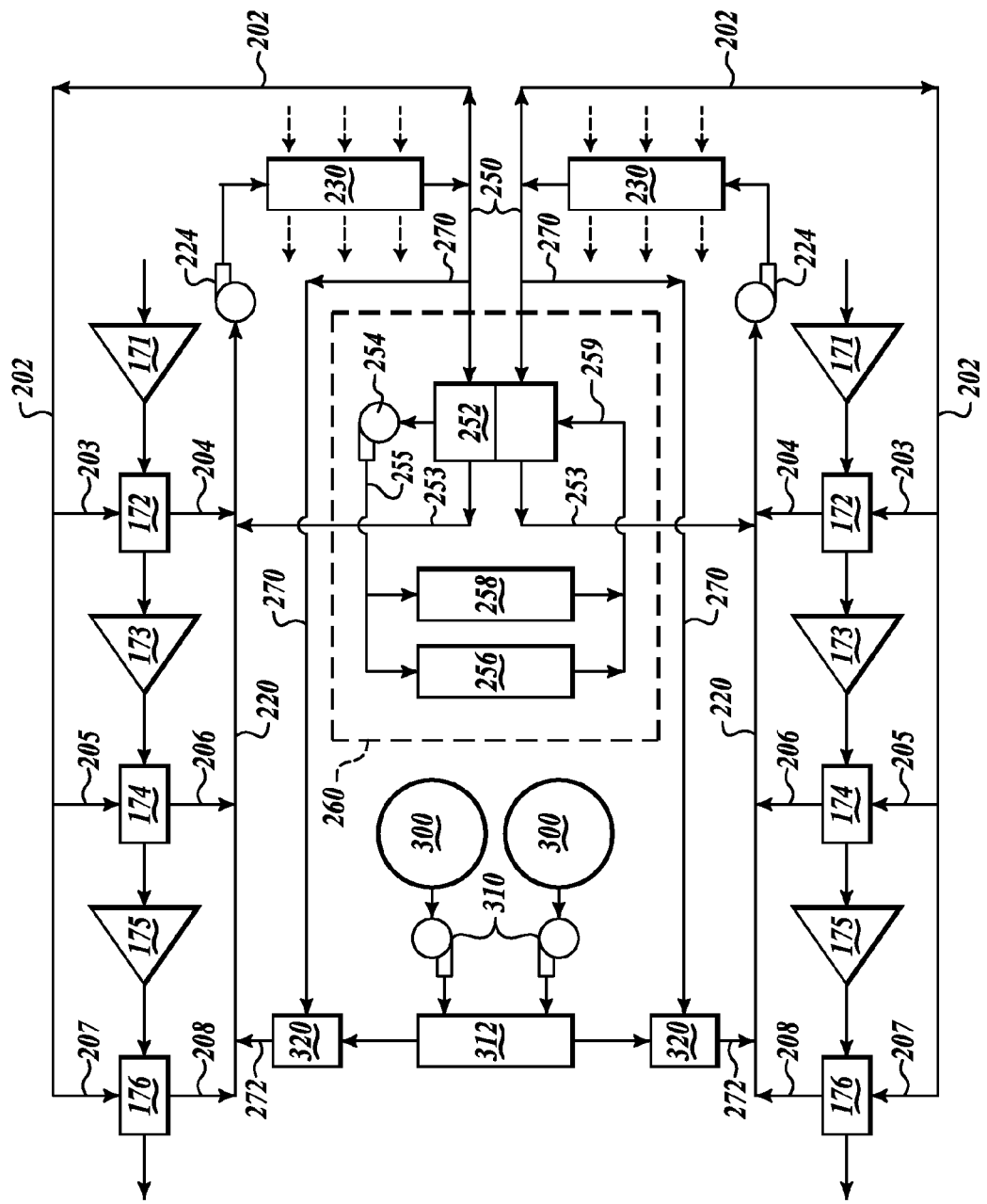
FIG. 4 is a block diagram depicting a flow scheme of a coolant system for a hydrogen powered aircraft, according to an embodiment of the invention.

FIG. 4 depicts an example of a cooling system of the aircraft, in block diagram form, that has three loops: a pair of loops that are identical and that cool the turbine compressors of each engine, and a third loop that maintains the environment for avionics boxes and payload boxes. The cooling system depicted uses a continuously recirculating liquid coolant, such as a mixture of propylene glycol and water, for example. This coolant is continuously circulated to collect heat that must be removed and is then subjected to cooling to remove the collected heat. The coolant is therefore reused in a continuous controlled cycle.

In general, heat must be removed from the engines 122, turbo compression system 171-175 of each of the engines 122, and also from the environmental control system 260, while heat must be added to the liquid hydrogen to convert it to a gaseous form for combustion. Accordingly, the coolant removes waste heat and applies that heat to the hydrogen gasification. Excess heat from the system is expelled to the environment.

Referring to the illustrated example that is based on a two-engine embodiment, three stages of air compression are used for each engine. The coolant system for each engine is identical to that of the other, and so only one will be explained in detail. Ram scoop air enters a low pressure compression turbine 171 and compressed heated air exits and flows to low pressure compression intercooler 172. The cold coolant is in a cold coolant header 202. Header 202 has a conduit 203 that diverts cold coolant to low pressure compression intercooler 172, a heat exchanger which transfers heat from the air to the coolant that exits via conduit 204 to heated coolant header 220. Cooled compressed air exiting the intercooler 172 enters an intermediate stage compression turbine 173 where it is compressed to a higher pressure and heated as a result of compression. The exiting heated air from turbine 173 enters an intermediate pressure intercooler 174, where the air is cooled by heat exchange with cold coolant supplied via conduit 205 from header 202. Warmed coolant exits intercooler 174 as heated coolant in conduit 206 and flows to header 220. Next, the cooled air exiting intercooler 174 enters a final high compression turbine 175 where it is further compressed and undergoes heating as a result. The heated exiting air from turbine 175 enters a high pressure intercooler 176 that transfers heat from the air to the coolant that enters intercooler 176 from header 202 via conduit 207 and exits the intercooler 176 as heated coolant via conduit 208 to header 220. Air exiting the intercooler 176 is delivered to an engine intake (not shown) at a pressure and temperature suitable for efficient engine operation.

Heated coolant in conduit 220 is drawn to the suction of pump 224 which pumps the hot coolant into a radiator 230 which is air cooled. The coolant is cooled to an extent necessary to retain sufficient heat to vaporize liquid hydrogen and to allow temperature control of the environmental system 260, illustrated as including the avionics boxes 256 and the payload boxes 258. Cooled coolant exits the radiator 230 and the flow is controlled to divide into three conduits: one conduit returns to header 202 for use in cooling the turbo compression system (as described above for each engine 122) so that the cycle repeats; a second conduit 250 to cool the environmental systems, and a third conduit 270 to supply heat to the liquid hydrogen.

As described above, with reference to FIG. 3, the liquid hydrogen is generally heated to a gaseous form in heat exchangers 320. Referring now to FIG. 4, the cooled but not cold, coolant in conduit 270 exiting radiator 230 retains sufficient heat to gasify the hydrogen liquid. The coolant enters heat exchangers 320 and exits as further cooled coolant in conduit 272, having lost heat to the liquid hydrogen. This coolant is routed from conduit 272 into conduit 220, and hence to pump 224. Pump 224 sends coolant back to radiator 230. From radiator 230, some of the coolant exits to conduit 270 so that the cycle is repeated.

A controlled portion of the coolant from radiator 230 entering conduit 250 is charged to a dual core heat exchanger 252, although other types of heat exchangers may also be used. This radiator-cooled coolant is then circulated by pump 254 via coolant header 255 to the environmental control system 260 that includes avionics boxes 256 and payload boxes 258, where the coolant picks up heat. The heated coolant circulates back to the heat exchanger 252, via heated coolant header 259, where it is cooled. A portion of the coolant exiting heat exchanger 252 enters the suction of pump 254 and is recirculated back to the environment 260, repeating the cycle. Another portion flows via conduit 253 to conduit 220 for recycle via pump 224 to air cooler 230. Other arrangements of the cooling system, including systems with a fewer or greater number of components, do not depart from the scope of this invention.

Figure 5A:
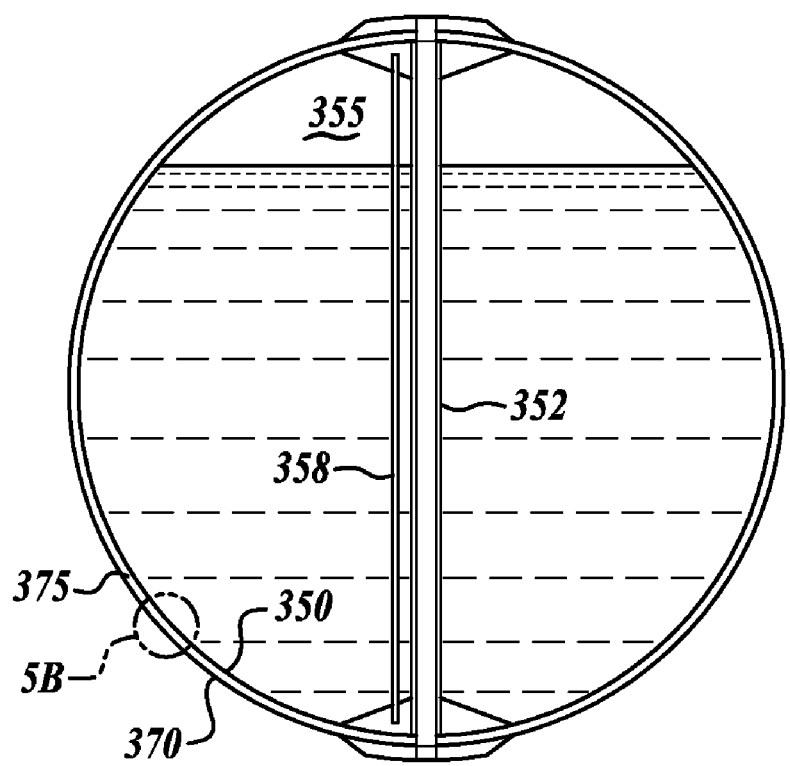
FIG. 5A is a cryogenic tank in partial cross section depicting double walled structure and support pillar, in accordance with an embodiment of the invention.
Figure 5B:
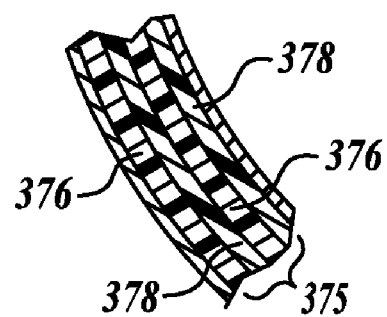
FIG. 5B is a cross sectional view of a portion of the tank of FIG. 5A showing internal insulation.

As shown in FIG. 5A, an embodiment of a cryogenic tank 300 depicted in partial cross section has an inner spherical wall 350 and a surrounding outer spherical wall 370 with an annular space 375 between the two walls. The inner wall 350 is supported away from and by the outer wall by a central vertical double-walled pillar 352. The use of a single support pillar 352 minimizes conductive heat transfer from the outer wall to the inner chamber 355. The inner chamber 355 contains liquid hydrogen to a height measured by a capacitance gauge 358, when the tank 300 is in use. The annular space 375 is at a near complete vacuum, with a pressure as low as $1 \times 10^{-6}$ torr, to reduce heat transfer through the annular space. In addition, as shown in FIG. 5B, in some embodiments the space 375 may be filled with a thermal insulating material, such as for example fiber glass or epoxy, or alternating layers of perforated, double side aluminized polyimide film such as Kapton® 376 (a trademark of Dupont of Delaware, available from MPI Technologies Inc. of Winchester, Mass.) and polyester netting such as Dacron® (a trademark of Invista North America of Wichita, Kans., available from Apex Mills, of Inwood, N.Y.) netting 378, or other suitable thermal insulation product or combination of products that has a desired low heat transfer.

The liquid hydrogen cryogenic tanks 300 should also be fitted with other ancillary and safety equipment as dictated by good engineering practices, for example a vent system to prevent over pressurization, a ground fill and drain system, recirculation system and supply system.

In one embodiment, the invention provides an aircraft that has a fuselage and wings extending from the fuselage; a cryogenic container adapted to contain liquid hydrogen; a heat exchanger receiving liquid hydrogen from the container which is in fluid communication with an interior of the container, the heat exchanger; and an engine mounted to the fuselage or wings that is adapted for combustion of gaseous hydrogen as fuel.

Optionally this embodiment may include several features such as an intercooled compression system supplying compressed intake air to the engine. The container may be located in a cavity within the fuselage. The container may be a double-walled container with a reduced pressure region approximating a vacuum between the walls. The container may have an inner wall of aluminum alloy. An annular space between the inner wall and a surrounding outer wall may have an insulation material therein. The insulation material may include alternating layers of polyimide and polyester insulating material. The engine may be an internal combustion engine. The heat exchanger may be in fluid communication with coolant that contains heat removed from air compression turbines. The heat exchanger may be configured to transfer heat from the coolant to liquid hydrogen to convert the hydrogen liquid to hydrogen gas. The aircraft may have a pump with a suction in fluid communication with an interior of the container and an outlet in fluid communication with the heat exchanger so that when the aircraft is in use, the pump charges liquid hydrogen to the heat exchanger and the heat exchanger supplies gaseous hydrogen to the engine.

In another embodiment, the invention provides an aircraft that includes a fuselage and wings extending from the fuselage; a cryogenic container adapted to contain liquid hydrogen; a pump having a suction in fluid communication with an interior of the cryogenic container and adapted for pumping liquid hydrogen; an engine adapted for combusting gaseous hydrogen as fuel; a cooling system that has a circulating coolant that removes waste heat generated by air compression and hydrogen combustion; and a heat exchanger, in fluid communication with a discharge of the pump and with the coolant, to transfer heat from coolant to liquid hydrogen when the aircraft is in use.

Optionally, this embodiment may include several other features including an inter-cooled compression system supplying compressed intake air to the engine. The container may be a double-walled container with a vacuum between the walls. The container may have an inner wall comprised of an aluminum alloy. An annular space between the inner wall and an outer wall may have an insulation material therein. The insulation material may be alternating layers of polyimide and polyester insulation material.

In yet another embodiment, the invention provides an aircraft that has a fuselage having wings extending from the fuselage; a cryogenic container adapted to contain liquid hydrogen and located within the fuselage, the container has at least an inner wall surrounded by and spaced from an outer wall, with an annular space between the inner and outer walls having an insulation material, the outer wall supporting the inner wall; a pump having a suction in fluid communication with an interior of the cryogenic container adapted for pumping liquid hydrogen; an internal combustion engine adapted for combusting gaseous hydrogen as fuel; an inter-cooled turbo compression system supplying compressed air to the engine; and a heat exchanger is in fluid communication with a discharge of the pump, and a coolant, to transfer heat from coolant to liquid hydrogen when the aircraft is in use.

Optionally, the embodiment may also include a hydrogen reservoir intermediate the pump and the engine, where the reservoir receives liquid hydrogen from the pump and is in fluid communication with the heat exchanger.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. An aircraft comprising:
   a fuselage;
   wings extending from the fuselage, wherein the wing to fuselage length ratio is about 3.0 or greater;
   at least one cryogenic container having a spherical shape mounted within and comprising an external portion secured to a frame portion of the fuselage, the at least one cryogenic container adapted to contain liquid hydrogen;
   a heat exchanger for receiving liquid hydrogen from the at least one cryogenic container and heating the liquid hydrogen to produce gaseous hydrogen;
   at least one propulsion engine mounted to the wings for using the gaseous hydrogen as fuel, wherein the at least one propulsion engine is an internal combustion engine, and wherein the fuselage comprises a design that conforms to a predetermined shape and size of the at least one cryogenic container.

2. The aircraft of claim 1, further comprising an intercooled compression system supplying compressed intake air to the at least one propulsion engine.

3. The aircraft of claim 1, wherein the at least one cryogenic container comprises a double-walled container with a region of reduced pressure between the walls.

4. The aircraft of claim 1, wherein the at least one cryogenic container comprising an inner chamber bounded by an inner spherical wall of aluminum alloy, and a surrounding outer spherical wall with an annular space between the inner and the outer spherical wall, wherein the inner spherical wall is supported away from and by the outer spherical wall by a central vertical double-walled pillar that minimizes conductive heat transfer from the outer spherical wall to the inner chamber.

5. The aircraft of claim 4, wherein the annular space between the inner spherical wall and the surrounding outer spherical wall comprises an insulation material.

6. The aircraft of claim 5, wherein the insulation material comprises alternating layers of polyimide film and polyester netting.

7. The aircraft of claim 1, wherein the at least one cryogenic container is located in a cavity within the fuselage.

8. The aircraft of claim 1, wherein the heat exchanger is in fluid communication with coolant comprising heat from air compression turbines.

9. The aircraft of claim 8, wherein the heat exchanger is configured to transfer heat from the coolant to liquid hydrogen to convert the hydrogen liquid to hydrogen gas.

10. The aircraft of claim 1, further comprising a pump having a suction in fluid communication with an interior of the at least one cryogenic container and an outlet in fluid communication with the heat exchanger so that when the aircraft is in use, the pump charges liquid hydrogen to the heat exchanger and the heat exchanger supplies gaseous hydrogen to the at least one engine.

11. An aircraft comprising:
   a fuselage;
   wings attached to the fuselage at an attachment location, wherein the wing to fuselage length ratio is about 3.0 or greater;
   first and second spherical cryogenic containers for containing liquid hydrogen, the first container ahead of the wing attachment location, the second container rear of the wing attachment location, each of said cryogenic containers comprising an external portion secured at said attachment location to a frame portion of said fuselage;
   a first and a second pump respectively associated with the first and second spherical cryogenic container each adapted for pumping liquid hydrogen, each first and second pump having a suction in fluid communication with a first and a second interior each respectively associated with each of the first and second spherical cryogenic containers;
   an engine adapted for combusting gaseous hydrogen as fuel;
   a cooling system comprising a circulating coolant, the coolant removing waste heat generated by air compression and hydrogen combustion; and
   a heat exchanger in fluid communication with a discharge of the pump, and in fluid communication with the coolant, the heat exchanger transferring heat from coolant to liquid hydrogen when the aircraft is in use, wherein the fuselage comprises a design that conforms to a predetermined shape and size of each of the first and second spherical cryogenic containers.

12. The aircraft of claim 11, further comprising an intercooled compression system supplying compressed intake air to the engine.

13. The aircraft of claim 11, wherein each container comprises a double-walled container with a vacuum between the walls.

14. The aircraft of claim 11, wherein each container comprises an inner wall comprised of an aluminum alloy.

15. The aircraft of claim 14, wherein an annular space between the inner wall and an outer wall comprises an insulation material.

16. The aircraft of claim 15, wherein the insulation material comprises alternating layers of polyimide and polyester insulation.

17. The aircraft of claim 11, wherein each container is located in a cavity within the fuselage.

18. An aircraft comprising:
a fuselage having wings extending from the fuselage, wherein the aircraft has high aspect ratio wings having a wingspan to fuselage length ratio of about 3.0 or greater;
a spherical cryogenic container adapted to contain liquid hydrogen, the spherical cryogenic container located within and mounted to the fuselage, said cryogenic container comprising an external portion secured to a frame portion of said fuselage;
a pump adapted for pumping liquid hydrogen, the pump having a suction in fluid communication with an interior of the cryogenic container;
an internal combustion engine for combusting gaseous hydrogen as fuel to provide propulsion;
an intercooled compression system supplying compressed air to the engine; and
a heat exchanger in fluid communication with a discharge of the pump, and in fluid communication with a coolant, the heat exchanger transferring heat from coolant to liquid hydrogen when the aircraft is in use, wherein the fuselage comprises a design that conforms to a predetermined shape and size of the spherical cryogenic container.

19. The aircraft of claim 18, further comprising a hydrogen reservoir intermediate the pump and the engine, the reservoir receiving liquid hydrogen from the pump and the reservoir in fluid communication with the heat exchanger.

\* \* \* \* \*